4 Sheets—Sheet 3.
W. SPEAR.
Machine for Picking and Husking Corn.
No. 235,038. Patented Nov. 30, 1880.
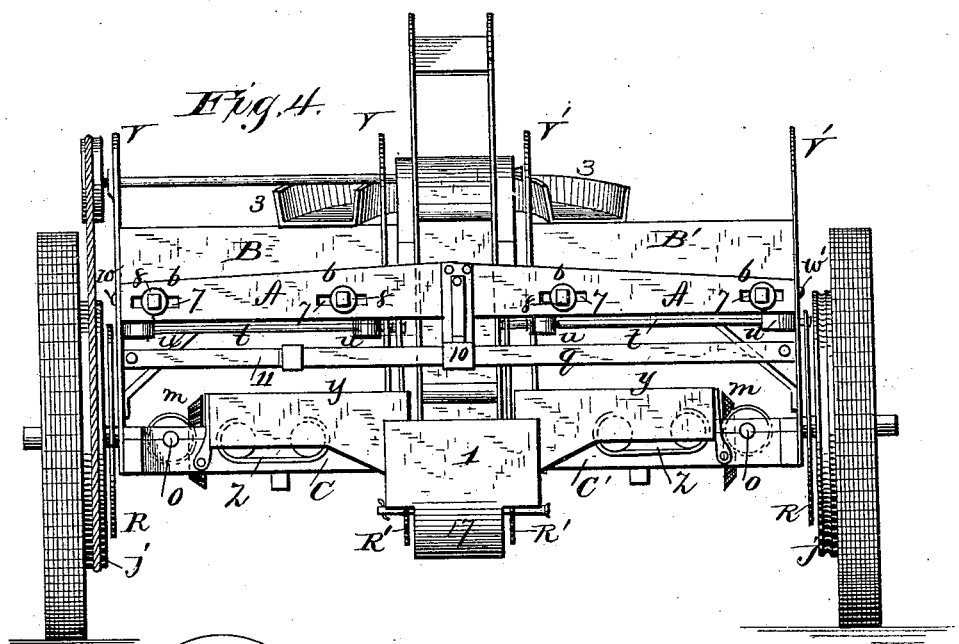
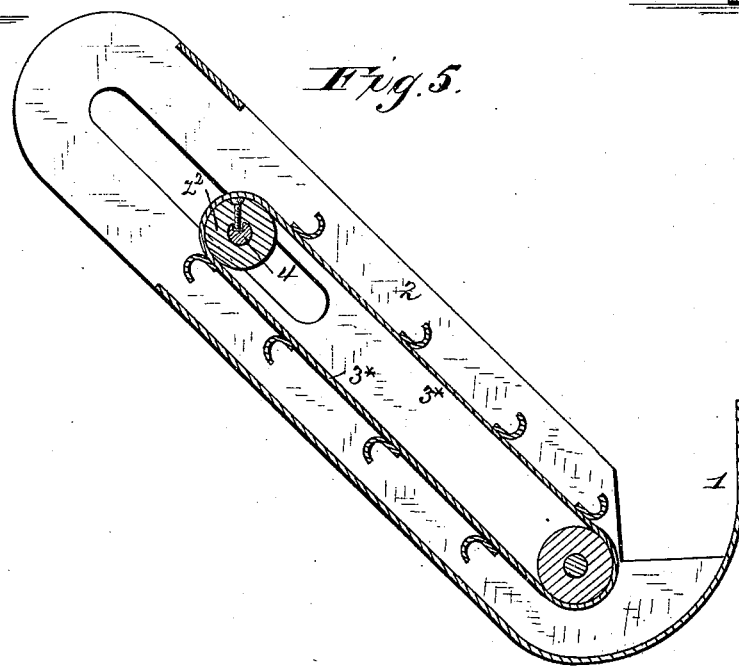
Witnesses,
F. L. Ouraud
Penn Halsted
Inventor,
Warren Spear
by John J. Halsted
his Attorney.
N. PETERS, PHOTO-LITHOGRAPHER, WASHINGTON, D. C.

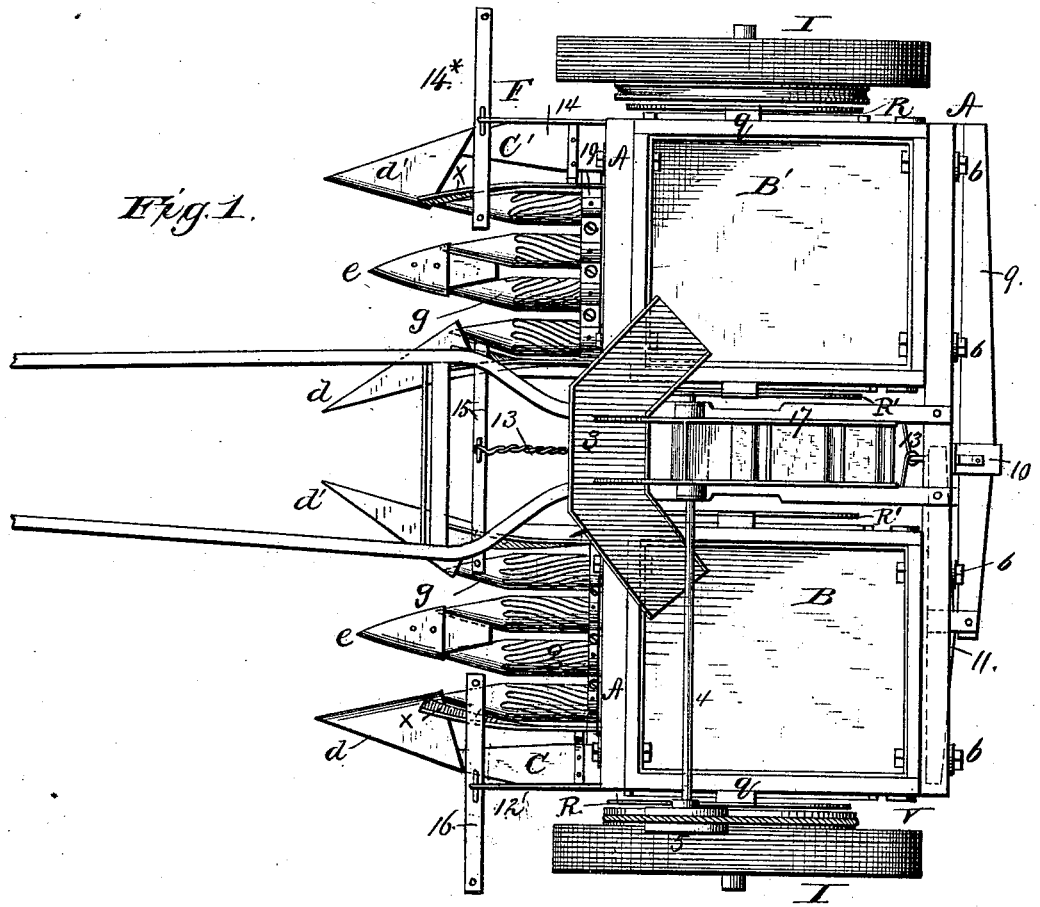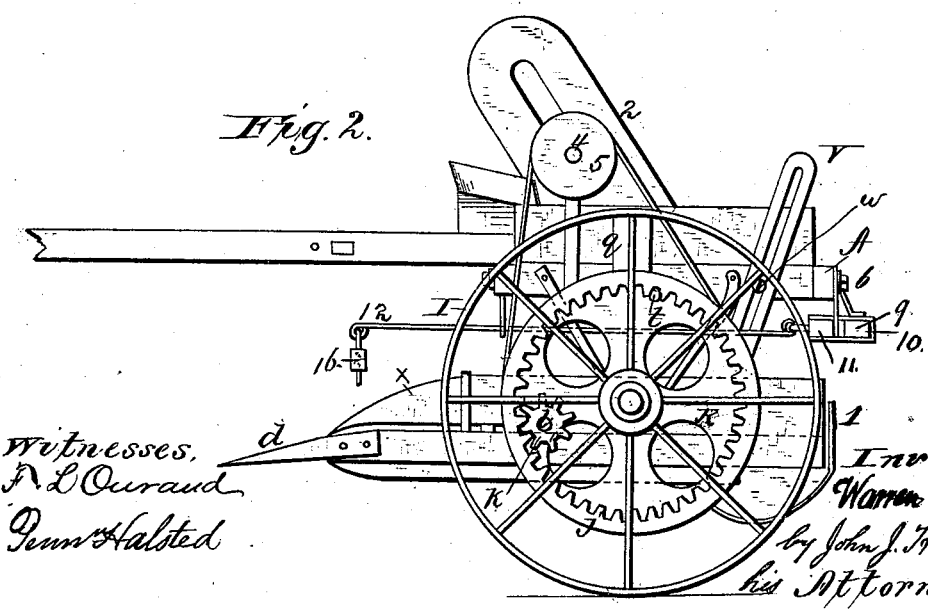

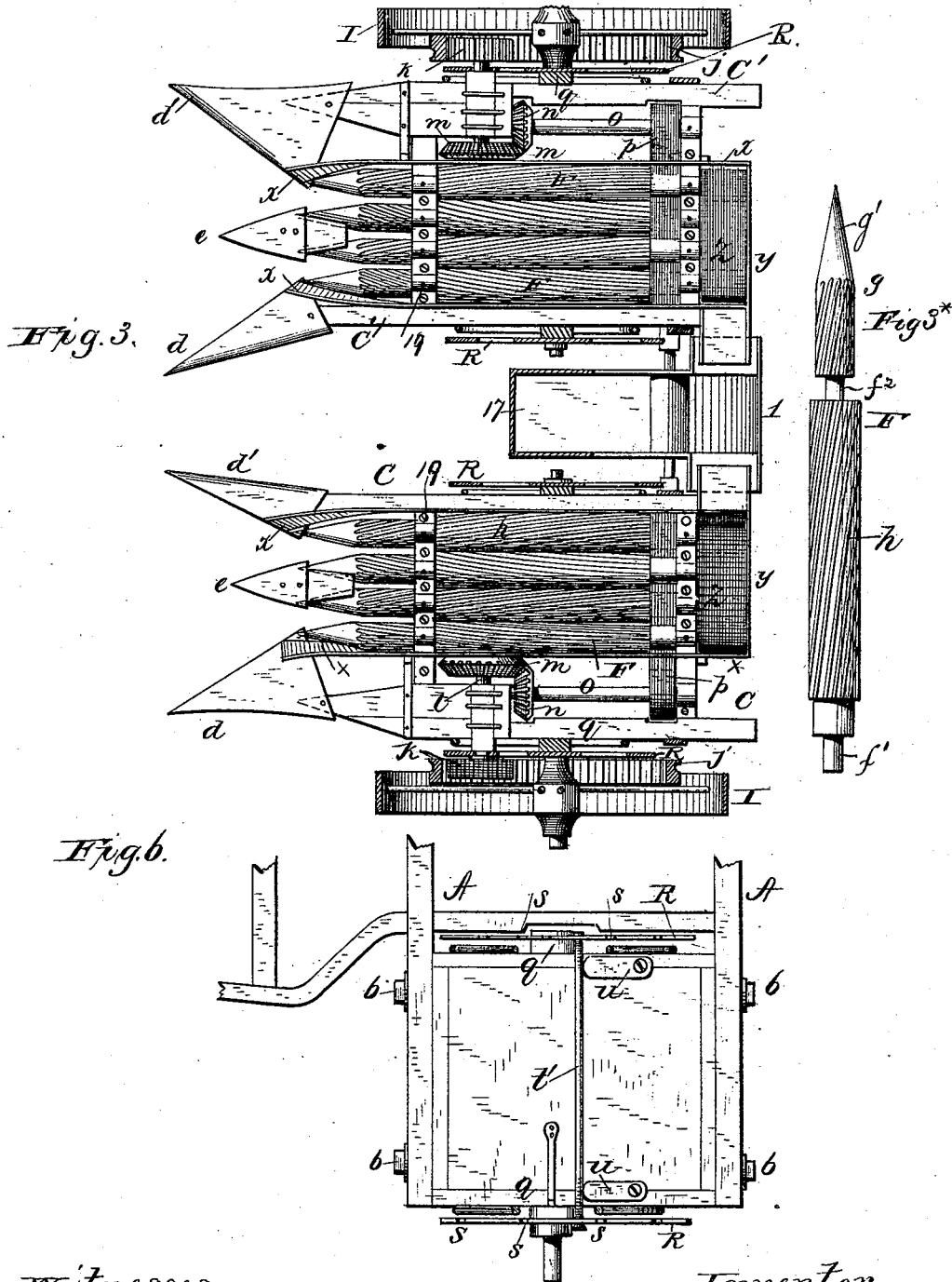

W. SPEAR.
Machine for Picking and Husking Corn.
No. 235,038. Patented Nov. 30, 1880.
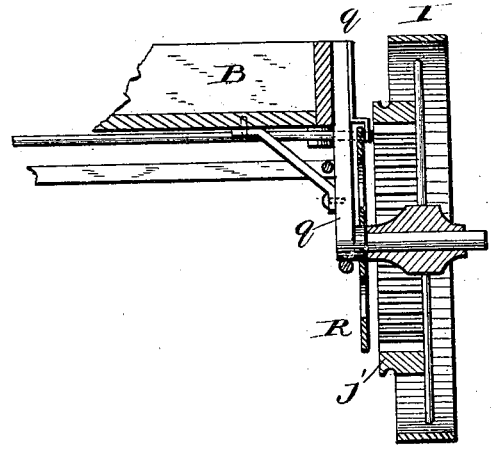
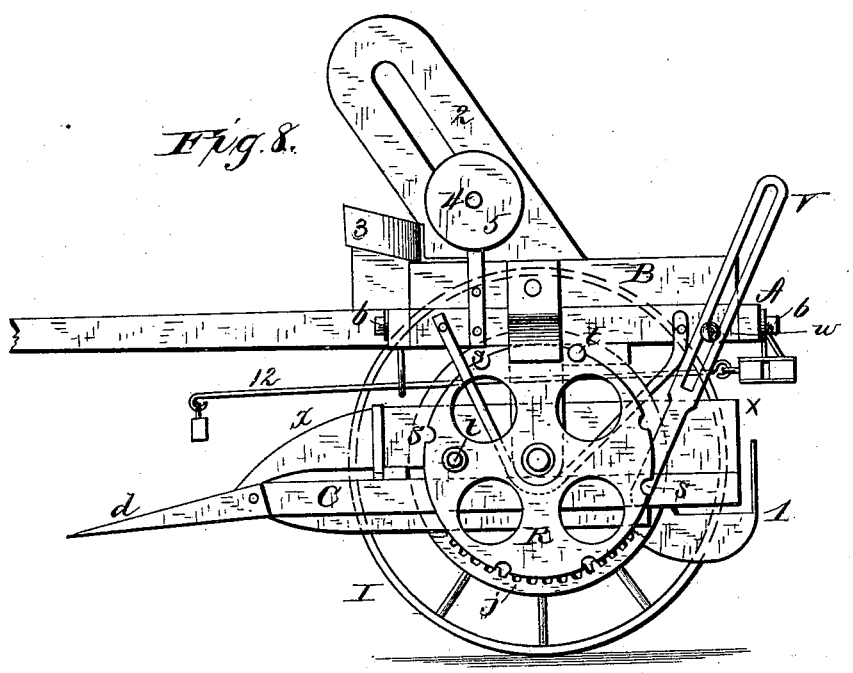

UNITED STATES PATENT OFFICE.

WARREN SPEAR, OF AURORA, ILLINOIS.

MACHINE FOR PICKING AND HUSKING CORN.

SPECIFICATION forming part of Letters Patent No. 235,038, dated November 30, 1880.

Application filed December 15, 1879.

*To all whom it may concern:*

Be it known that I, WARREN SPEAR, of Aurora, in the county of Kane and State of Illinois, have invented certain new and useful Improvements in Machines for Picking and Husking Corn; and I do hereby declare that the following is a full, clear, and exact description of the invention, which will enable others skilled in the art to which it appertains to make and use the same, reference being had to the accompanying drawings, and to letters of reference marked thereon, which form a part of this specification.

In the accompanying drawings, Figure 1 is a plan view of a machine embodying my improvements; Fig. 2, a side view; Fig. 3, a horizontal section under the boxes; Fig. 3*, a detail, showing one of the rollers; Fig. 4, a rear view; Fig. 5, a detail, being a vertical section of the elevator; Fig. 6, a view of the under side of the box, showing the adjusting-rods; Fig. 7, a detail, showing one of the wheels and its connections, and its short axle; and Fig. 8, a side view, with the near wheel removed.

My invention consists in the construction and arrangement of the gathering and husking rollers; in the means by which they are operated; in special mechanism for raising and lowering at will the gathering and husking devices to accommodate the machine to high and low corn in the field; in mechanism for increasing or decreasing the width of the machine to adapt it to the different widths of rows of corn in different fields; in suspending the gathering and husking devices in part from the boxes or husked-corn receivers and between the carriage-wheels; in the arrangement of mechanism for elevating the husked corn to these boxes or receivers; in combining with a non-adjustable frame two sets of gathering and husking devices, by means whereby these sets may be laterally adjusted relatively to each other; in combining these laterally-adjustable devices and the non-adjustable frame with laterally-adjustable corn-receiving boxes; in combining vertically-adjustable gathering and husking devices with a central elevator adapted to be raised and lowered; in combining with the non-adjustable main frame laterally-adjustable gathering and husking rolls, laterally-adjustable short axles, and carriage-wheels; in combining with such main frame and with adjustable rolls and wheels laterally-adjustable corn-receiving boxes; in a provision for shifting the carriage-wheels and their short shafts, between which the picking and husking rollers are located, to or from each other simultaneously with the shifting of the sets of picking-rolls to or from each other; in a special arrangement of the elevator and its frame, and in other features and details, all as hereinafter more particularly set forth.

A A represent the main frame, on which are supported the boxes B B', and from which are suspended the lower or husking and picking frames, C C', and most of the operative mechanism.

Before describing the construction of this mechanism I would state that the machine is intended to be drawn by three horses abreast, each walking in a furrow, and to pick or gather from two rows of corn standing in the field.

Each frame C and C' is severally provided with gathering-points $d\ d'$ and with a dividing-point, $e$, the points $d'\ d$ flaring, respectively, to the right and left sufficiently to gather the whole row, which row is then divided by the dividing-point.

F F, &c., are grooved and ribbed cylinders or rollers supported in appropriate bearings at $f'\ f^2$ in the frames C C', and they perform the double duty or function of picking the ears from the stalks and the husks from the ears after being picked. The forward or picking ends $g$ $g$ of these rollers are smooth pointed or tapering at $g'$, and have a space between each pair sufficient to permit the cornstalks to enter as the machine is drawn through the field, but not to allow the ears of corn to drop through as they are stripped off by the action of the machine. The remaining portions $h\ h$, of the length of these grooved rollers, are of greater diameter than the picking ends, and they are so close to each other that the ribs of each pair mesh or engage with the grooves of its fellow, thus rendering them admirably adapted for stripping the shocks or husks from the ears, which pass to them after leaving the pickers $g\ g$.

It will be seen that as each of the pickers and husking-rolls are all in one piece, and in one and the same line of direction with the draft of the machine, the line of travel of the ears is directly from front to rear until discharged from the husking-rolls; that these rolls form a table or bed to support the ears until so discharged, and that no gearing is used, as heretofore has been required, to connect independent pickers with independent husking-rollers when set at an angle to each other, and there is no useless expenditure of power.

The ribs and grooves of the rollers F may be straight or spiral.

The means for imparting motion to the rollers F F is as follows: On each of the carriage-wheels I is an internally-geared wheel, $j$, which, as the machine is drawn along, actuates a pinion, $k$, on a short shaft, $l$, which has its bearings in the frame C, and at the opposite end of each of the short shafts $l$ is a beveled gear, $m$, which engages with a beveled pinion, $n$, on a shaft, $o$, which latter, either by means of an endless belt, $p$, passing alternately over and under the ends of rollers F F, or, if desired, by equivalent gears on such ends and a connecting-gear on the shaft $o$, causes the said rollers to revolve those of each pair in opposite directions to strip the husks from the ear, as before described; or the shaft $o$ may be geared to the first roller, and each roller may act as its own gear by means of the spiral or straight grooves and ribs meshing into each other. The axles of the carriage-wheels are both short ones, their inner ends terminating at a point outside the frames C and C', and they are mounted upon hangers $q$, depending from the boxes B B', and upon the inner end of each of these axles is centered a disk, R, the shaft $l$ passing through such disk near its periphery. These disks, as also two similar ones, R', centered on the hangers depending from the boxes, are provided with notches $s$ on their peripheries to admit a locking-bar, $t$, placed one under each box, this locking-bar being held to place at one side by the hangers, and on the opposite side by any appropriate adjustable or removable detent or stop—as, for instance, swinging pieces or buttons $u$.

The frames C C' are toward their rear again severally supported or hung upon two slotted bars, V V', one at each side, these bars being pivoted to the frames C C', and their slotted portions working on pins or pivots $w$ $w'$.

When it is desired to raise or lower the frames C C', to adapt them to the height of the corn to be picked, by bringing the picking-rollers to the requisite elevation and position, the bar $t$ is first released, and this allows the turning of the disks upon their centers; but as each of the outer disks carries a shaft, $l$, which has its bearings in the forward portion of the frame, this frame C or C' must rise or fall proportionately, and when adjusted to the desired height the front part of the frame may be again secured by the reinsertion of the locking-bars in the notches of their appropriate disks, and by then securing the bars again to place.

In order to give to the rollers F F the proper inclination the slotted bars V, previously described, are used.

The frames C C' are each provided with side guards or guides, $x$, and rear ones, $y$, to confine the corn in its passage to the rear of the machine, where it is first received upon an endless belt or conveyer, $z$, upon the ends of the rollers F, and thence carried by it toward the center of the machine and delivered into a hopper, 1, from which, by means of the buckets of an elevator, 2, it is carried upward and forward and dropped into a chute, 3, from which it is finally landed in one or the other of the boxes B or B'.

The belt 3* is driven by a roll on shaft 4, whose pulley 5, at its outer end, is geared by a belt or otherwise with the carriage-wheel.

To shift the two sets of mechanism nearer to or farther from each other, or, in other words, to increase or diminish the width of the machine to suit the different widths or distances apart of the rows of corn in different fields, I have devised the following means, viz: The boxes B B' (which, by the bye, are not vertically adjustable) are connected to the main frame A by means of bolts 6 6, which pass through horizontal slots 7 7 in this frame. Upon loosening the nuts 8 on these bolts the boxes may be moved to or from the center of the machine to the extent desired, and such movement and adjustment of the boxes moves and adjusts all the parts hung or attached thereto, namely, the gatherers, dividers, picking and husking devices, and their connections, and also the carriage-wheels, the shaft 4 being arranged to shift to allow of this, a pin or screw projecting through the roll $Z^2$ into a longitudinal groove or slot in the shaft 4, and the shaft or journal of the lower belt-roller being also arranged to slip or slide in lugs or brackets on the frames C C'. In making this lateral adjustment no change or adjustment of the elevator-belt 3* is needed; but when the roller-frames C C', either or both, are raised or lowered, as hereinbefore described, this belt is lengthened or shortened to correspond.

The draft-equalizer, in order to be out of the way of the cornstalks, is placed at the rear of the carriage, instead of in front, as is customary in vehicles where it is used, and it consists of the lever 9, pivoted on a bracket, 10, attached to the back of the carriage-frame A, a shorter lever, 11, connected to the short arm of said lever 9, and rods or bars 12, 13, and 14, connecting the two extremities of lever 11 and the longer arm of lever 9, respectively, with the three whiffletrees 16, 15, and 14*.

The bar or rod 13, connected to the central whiffletree, is made to span or pass around the frame 17 of the elevator, this latter being located centrally between the wheels. The side walls of this elevator-frame are slotted, as shown at 18, to permit it to rise and fall when the roller-frame is raised and lowered.

The driver's seat is preferably to be placed just in the rear of the elevator, and arranged to slide forward or backward, to allow the driver to balance the machine, and the inclination of the elevator upward and forward not only affords ample room for these purposes, but also thus permits the driver to inspect the action of the elevator and also to observe readily when the boxes become full.

When the boxes become filled with corn a wagon is brought alongside, and the corn is shoveled into it; or the wagon may be driven abreast or alongside of the machine, and the corn, as fast as it is husked, carried from the machine into the wagon by means of a side elevator arranged for the purpose.

From the above description it will now be seen that when the machine is drawn through the corn-field the stalks of each row are guided in between the gatherers, separated by the divider, and pass into the spaces between the picking-ends $g$. Upon their arrival at the cross-bar 19, upon which the journals of the rollers F rest, the ears are picked off, and as the carriage continues to move forward the stalks are necessarily bent downward and pass under the machine, leaving the ears upon the rollers to be stripped of their remaining husks, as before explained.

It will be seen that as the stalks and stems of ears of corn are griped and drawn through between the rollers most of the husks are pinched and pulled off and left on the stalk, and not strewn all over the field.

It will also be seen that the stalks are not cut off or severed and strewn over the field, liable to be trampled upon, but are left standing in the ground and in the best and most economical condition for the turning in of live stock after the corn is harvested; that the rolls have no teeth, knobs, or projections to stick into and cling either to the stalks or to the ears, and thus clog the machine, or to shell the corn from the cob, and that I avoid all vertically-arranged rolls; that the rolls form the support or bed over which the ears travel from the front to the rear of the machine, and that the described construction permits a single machine to be adapted in height and in breadth to different fields, whether the corn be high or low, or whether the rows be more or less apart from each other, while there are in front of the carriage none of the usual devices, such as equalizing-levers or otherwise, to offer any impediment or obstruction to the full and free action of the machine upon the stalks and ears.

I claim—

1. The husking and picking roll F, as made with the ribbed parallel-sided or cylindrical portion $h$, the grooved cylindrical portion $g$, of lesser diameter than $h$, and smooth-pointed beyond its grooves, the reduced forward journal or bearing, $f^2$, between these portions $h$ and $g$, and the journal or bearing $f'$ at the rear end, as shown and described.

2. Pairs of husking and picking rolls F, having the cylindrical grooved or ribbed parts $g$, of lesser diameter than the cylindrical ribbed part $h$, and journaled, as shown and described, at $f'$ $f^2$, and applied as described, with the ribs of the part $h$ of each of the pair engaging and meshing in the groove or space between the ribs of the part $h$ of the other roll of the pair.

3. In combination with the husking-rolls, and with their supporting-frame adapted to be raised or lowered at both ends at the same time, if desired, the internal gear, $j$, pinion $k$, shaft $l$, geared shaft $o$, gear $m$, and endless belt $p$, as and for the purposes set forth.

4. The combination, with the roller-frame and its husking-rolls, of the driving-wheels provided with internal gears, and having the notched disks R, provided with locking devices and centered on the short axles of the wheels, the combination permitting the shifting of the disks relatively to the wheel, and thereby the raising or lowering of the pinions $k$ and their shafts $l$, and permitting the raising or lowering of the forward end of the roller-frame hanging between but not upon the wheel-axles, as and for the purposes described.

5. As a means for raising or lowering and for securing in position the roller-frame, the combination of the adjustable notched disks R, pinion-shaft $l$, locking-bar $t$, for connecting the two disks, and its pivoted buttons or detents, substantially as shown and described.

6. In a corn harvester and husker, the combination, with a fixed carriage-frame, of a frame hung beneath the same, and between but not directly upon short axles of the carriage, and supporting the gathering and husking devices, and adapted also to be raised and lowered between said axles, either at its front or at its rear, or at both front and rear together, as and for the purpose set forth.

7. In combination with the boxes which receive the husked corn, the roller-carrying frame attached to and adjustably suspended in part from said boxes.

8. In a corn harvester, the combination, with the non-adjustable main frame A, of two sets of gathering and husking devices provided with mechanism, substantially as described, whereby these sets may be laterally adjusted toward or from each other.

9. In combination with the non-adjustable main frame, the described laterally adjustable gathering and husking devices and the described laterally-adjustable corn-receiving boxes.

10. In combination with vertically-adjustable gathering and husking devices, a central rising and falling elevator serving to receive from both sets of such devices and to deliver into both receiving-boxes, substantially as and for the purpose set forth.

11. In combination with the non-adjustable main frame, laterally-adjustable gathering and husking rolls and laterally-adjustable short axles and carriage-wheels connected to and shifted therewith, substantially as and for the purposes set forth.

12. In combination, the non-adjustable main frame, laterally-adjustable gathering devices, laterally-adjustable carriage-wheels, and laterally-adjustable corn-receiving boxes.

13. In a corn picker and husker having sets of rollers which pick and husk and are located between the axles of the wheels, carriage-wheels on short shafts, and arranged to be shifted wider apart from or nearer to each other simultaneously with the shifting of such sets of rollers.

14. In combination with the gathering and husking rolls which deliver at the rear of the machine, the central elevator and its frame projecting upward and forward through the space between the two sets of rolls and between the receiving-boxes, whereby room is left at the rear of the elevator and its frame and between the boxes for a driver's seat.

WARREN SPEAR.

In presence of—
D. M. CLAPSADDLE,
N. F. NICHOLS.